(12) United States Patent
Klaiber et al.

(10) Patent No.: US 7,937,700 B1
(45) Date of Patent: May 3, 2011

(54) SYSTEM, PROCESSOR, AND METHOD FOR INCREMENTAL STATE SAVE/RESTORE ON WORLD SWITCH IN A VIRTUAL MACHINE ENVIRONMENT

(75) Inventors: Alexander C. Klaiber, Mountain View, CA (US); Michael Shawn Greske, Fremont, CA (US); Hongwen Gao, Union City, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1626 days.

(21) Appl. No.: 11/065,777

(22) Filed: Feb. 25, 2005

Related U.S. Application Data

(60) Provisional application No. 60/569,995, filed on May 11, 2004.

(51) Int. Cl.
*G06F 9/455* (2006.01)
*G06F 9/46* (2006.01)
*G06F 13/00* (2006.01)
*G06F 7/38* (2006.01)

(52) U.S. Cl. .............. 718/1; 718/108; 711/106; 712/228
(58) Field of Classification Search ................ 718/1, 108
See application file for complete search history.

(56) References Cited

U.S. PATENT DOCUMENTS

| | | | |
|---|---|---|---|
| 5,555,414 A * | 9/1996 | Hough et al. | 710/261 |
| 5,826,084 A | 10/1998 | Brooks et al. | |
| 6,785,886 B1 * | 8/2004 | Lim et al. | 718/1 |
| 2003/0217250 A1 | 11/2003 | Bennett et al. | |
| 2004/0117532 A1 | 6/2004 | Bennett et al. | |
| 2005/0198633 A1* | 9/2005 | Lantz et al. | 718/1 |

OTHER PUBLICATIONS

James L. Turley, "Advanced 80386 Programming Techniques," ISBN 0-07-881342-5, 35 pages, 1988.
P.H. Gum, "System/370 Extended Architecture: Facilities for Virtual Machines," IBM J. Res Develop., vol. 27, No. 6, Nov. 1983, (pp. 530-544).

* cited by examiner

*Primary Examiner* — Kenneth Tang
(74) *Attorney, Agent, or Firm* — Lawrence J. Merkel; Meyertons, Hood, Kivlin, Kowert & Goetzel, P.C.

(57) ABSTRACT

In one embodiment, a processor comprises a plurality of registers configured to store processor state and an execution core coupled to the registers. The execution core is configured, during a switch between processor execution of a guest and processor execution of a virtual machine manager (VMM) that controls the guest, to save only a portion of the processor state to a memory. In another embodiment, a method comprises switching from processor execution of a first one of a guest and a virtual machine manager (VMM) to processor execution of a second one of the guest and the VMM, wherein the VMM controls execution of the guest; and during the switching, the processor saving only a portion of a processor state to memory.

28 Claims, 10 Drawing Sheets

Partial Host State Saved by SVM Instruction/Loaded at Guest Exit

CS.Selector
   next_RIP
   RFLAGS
   RAX
   SS.Selector
   RSP
   CR0
   CR3
   CR4
   EFER
   IDTR
   GDTR
   DS.Selector
   ES.Selector

102 —  — 100

Partial Guest State Loaded by SVM Instruction/Saved at Guest Exit

CS.Selector and CS.Hidden
   RIP
   RFLAGS
   RAX
   SS.Selector and SS.Hidden
   RSP
   CR0
   CR3
   CR4
   EFER
   IDTR
   GDTR
   DS.Selector and DS.Hidden
   ES.Selector and ES.Hidden
   DR6 and DR7
   VM Regs

Fig. 6

State Saved by VMSAVE Instruction/Loaded by VMLOAD Instruction

FS.Selector and FS.Hidden
GS.Selector and GS.Hidden
LDTR (including hidden state)
TR (including hidden state)
KernelGSBase
STAR, LSTAR, CSTAR, SFMASK
SYSENTER CS, ESP, EIP

— 130

SYSTEM, PROCESSOR, AND METHOD FOR INCREMENTAL STATE SAVE/RESTORE ON WORLD SWITCH IN A VIRTUAL MACHINE ENVIRONMENT

This application claims benefit of priority to U.S. Provisional Patent Application Ser. No. 60/569,995, filed on May 11, 2004.

BACKGROUND

1. Field of the Invention

This invention relates to virtualization and the use of virtual machines in processors and computer systems and, more particularly, to switching between guests and host in a processor/computer system implementing virtualization.

2. Description of the Related Art

Virtualization has been used in computer systems for a variety of different purposes. For example, virtualization may be used to execute privileged software in a "container" to prevent the privileged software from directly accessing and/or making changes to at least some of the physical machine state without first being permitted to do so by a virtual machine manager (VMM) that controls the virtual machine. Such a container may prevent "buggy" or malicious software from causing problems on the physical machine. Additionally, virtualization may be used to permit two or more privileged programs to execute on the same physical machine concurrently. The privileged programs may be prevented from interfering with each other since access to the physical machine is controlled. Privileged programs may include operating systems, and may also include other software which expects to have full control of the hardware on which the software is executing. In another example, virtualization may be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Both the VMM and the guests are executed by the processor(s) included in the physical machine. Accordingly, switching between execution of the VMM and the execution of guests occurs in the processor(s) over time. Particularly, the VMM schedules a guest for execution, and a switch to executing that guest is performed. At various points in time, a switch from executing a guest to executing the VMM also occurs so that the VMM can retain control over the physical machine (e.g. when the guest attempts to access a peripheral device, when a new page of memory is to be allocated to the guest, when it is time for the VMM to schedule another guest, etc.). A switch between a guest and the VMM (in either direction) is often referred to as a "world switch".

Generally, the world switch involves saving all of the processor's state for the guest/VMM being switched away from, and restoring all of the processor's state for the guest/VMM being switched to. In some cases, saving/restoring all of the state may be necessary. For example, when a guest is being started for the first time, none of the corresponding processor state has been loaded and thus all of the processor state may be saved/loaded. However, in other cases, some of the processor state may not change from guest context to VMM context and vice-versa. In still other cases, a world switch may be brief (e.g. the VMM may execute briefly to service a simple guest exit for an intercepted event), and only a small amount of processor state for the VMM may be needed.

SUMMARY

In one embodiment, a processor comprises a plurality of registers configured to store processor state and an execution core coupled to the registers. The execution core is configured, during a switch between processor execution of a guest and processor execution of a virtual machine manager (VMM) that controls the guest, to save only a portion of the processor state to a memory. The processor state corresponds to a first one of the guest and the virtual machine manager, whichever is being switched away from in the switch. A computer system comprising at least one guest, the VMM, and host hardware that includes the processor is also contemplated in some embodiments.

In another embodiment, a method comprises switching from processor execution of a first one of a guest and a virtual machine manager (VMM) to processor execution of a second one of the guest and the VMM, wherein the VMM controls execution of the guest; and during the switching, the processor saving only a portion of a processor state to memory, the processor state corresponding to the first one of the guest and the VMM.

BRIEF DESCRIPTION OF THE DRAWINGS

The following detailed description makes reference to the accompanying drawings, which are now briefly described.

FIG. 6 is a pair of tables illustrating one embodiment of processor state saved and loaded during switches between host and guest execution.

Figure 1:
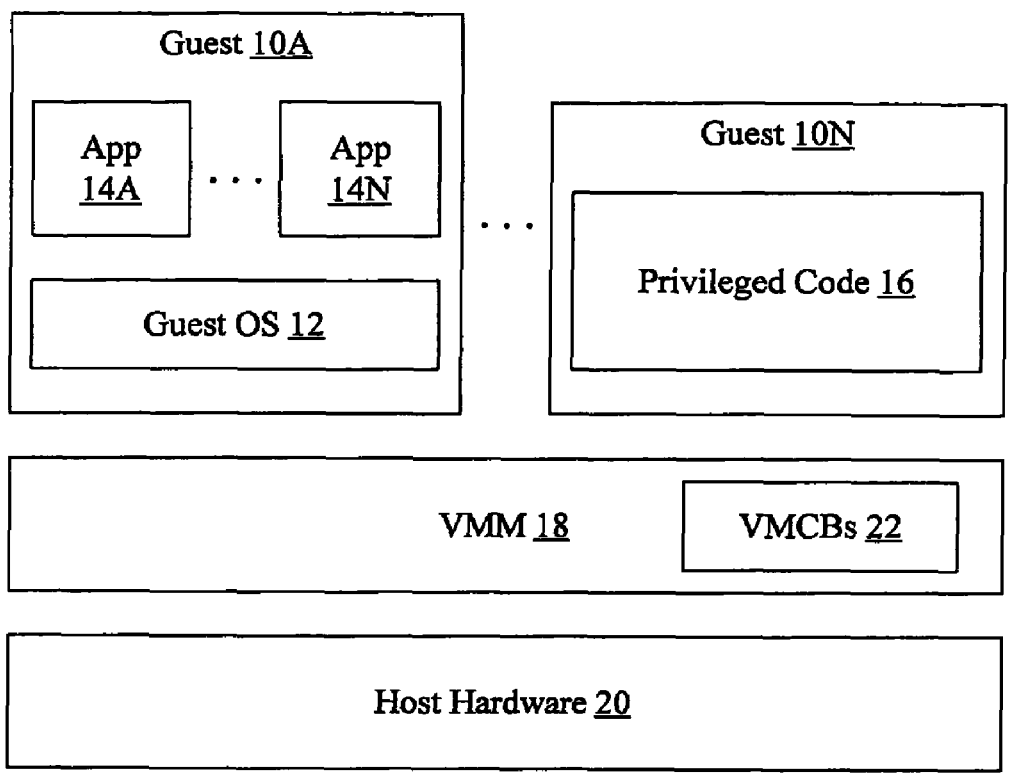
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables to remap from guest virtual addresses to host physical addresses (effectively the remapping the guest "physical address" assigned by memory management software in the guest 10A-10N to host physical address). Using the shadow page tables for each guest 10A-10N, the VMM 18 may ensure that guests do not access other guest's physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain (e.g. using device exclusion vectors for each protection domain that define which physical pages are accessible to the device and which are not).

As mentioned previously, the VMM 18 may maintain a VMCB 22 for each guest 10A-10N. The VMCB 22 may generally comprise a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for executing the guest). In some embodiments, only a portion of the processor state is loaded via the instruction that transfers control to the guest corresponding to the VMCB 22 (the "start virtual machine (SVM)" instruction), and other desired state may be loaded by the VMM 18 prior to executing the SVM instruction. Similarly, in such embodiments, only a portion of the processor state may be stored to the VMCB 22 by the processor on guest exit and the VMM 18 may/be responsible for storing any additional state as needed. In other embodiments, the VMCB 22 may include a pointer to another memory area where the processor state is stored.

In one embodiment, the VMM 18 may also have an area of memory allocated to store the processor state corresponding to the VMM 18. When the SVM is executed, the processor state corresponding to the VMM 18 may be saved in the area. When the guest exits, the processor state from the area may be reloaded from the area to permit the VMM 18 to continue execution. In one implementation, for example, the processor may implement a register (e.g. a model specific register, or MSR) to store the address of the VMM 18 save area.

In one embodiment, the VMCB 22 may also include a set of intercept indications, one indication for each intercept event that the processor supports. The intercept indication may indicate whether or not the processor is to intercept the corresponding event. As used herein, an event is "intercepted" in a guest if, should the event occur in the guest, the processor exits the guest for processing of the event (or other processing) in the VMM 18. Thus, in this embodiment, the VMM 18 may configure the processor to intercept only those events that the VMM 18 does not wish the guest 10A-10N to handle internally. Events may include instructions (that is, intercept an instruction instead of executing it), interrupts, exceptions, and/or any other desired events that may occur during guest execution. In other embodiments, the processor may enter a guest mode and intercept on all events supported by the processor.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

World Switch

The processor(s) in the host hardware 20 may support a world switch in which only a portion of the processor state is saved/loaded automatically by the processor during the switch. That is, the portion saved/loaded by the processor may exclude at least some of the processor state. The switch itself may occur, in some embodiments, more rapidly than if all of the processor state were saved/loaded. In some cases, such as when a guest 10A-10N exits to the VMM 18 in response to a given intercept and the VMM 18 only performs a small amount of processing due to that intercept, the state that is saved/loaded by the processor during the switch may be sufficient for the VMM 18 to process the intercepted event and return to the guest 10A-10N. In other cases, the VMM 18 may save/load additional processor state as needed. However, since only a portion of the state is automatically saved/loaded, the VMM 18 may have flexibility in how much additional state is saved/loaded and thus how much additional processing time is expended in the additional state save/load.

As used herein, a "switch" between processor execution of the VMM 18 and processor execution of the guest 10A-10N (in either direction) may generally refer to the processor ceasing execution of the instructions comprising a first one of the VMM 18 and the guest 10A-10N (whichever is currently executing and is being switched away from) and starting execution of the instructions comprising the other one of the VMM 18 and the guest 10A-10N (whichever is being switched to). Thus, instructions executed before the switch may be instructions from the currently executing one of the VMM 18 and the guest 10A-10N, and the instructions executed after the switch may be instructions in the one of the VMM 18 and the guest 10A-10N that is being switched to.

During the switch, the processor may transfer a portion of the processor state corresponding to the currently executing one of the VMM 18 and the guest 10A-10N from the processor to memory, and may transfer a portion of the processor state corresponding to the other one of the VMM 18 and the guests 10A-10N to the processor. In one implementation, the processor may support the SVM instruction mentioned above to cause a switch from the VMM 18 to a guest 10A-10N. Various intercepts in a guest's VMCB 22 may be programmed to cause a guest exit if the corresponding intercept event is detected, thus causing a switch from the guest 10A-10N to the VMM 18. The portion of the processor state saved from the currently executing VMM/guest and the portion of the processor state loaded for the VMM/guest that is being switched to may overlap, although there may be some differences as described in more detail below.

In some embodiments, the processor(s) may support additional instructions defined to save/load additional state to/from the VMCBs 22. These instructions will be referred to herein as the VMLOAD and VMSAVE instructions. The VMLOAD instruction is defined to load additional state from a VMCB 22 to the processor, and the VMSAVE instruction is defined to save additional state from the VMCB 22. For example, in some embodiments, the processor state may include "hidden state" in some registers. As used herein, hidden state is state saved in a processor register that is not directly readable via instruction execution. For example, in the x86 instruction set architecture, the segment registers have a non-hidden portion into which a segment selector identifying a segment descriptor in a segment descriptor table is loaded. Additionally, information from the segment descriptor (or derived from the segment descriptor) is loaded into a hidden portion of the segment register when a segment selector is loaded. The non-hidden portion may also be read from the register via instruction execution (e.g. to be stored to memory), but the hidden portion storing the segment descriptor information cannot be directly read via instruction execution according to the x86 instruction set architecture. In some embodiments, the VMLOAD/VMSAVE instructions may be defined to load/save the hidden state from/to the VMCB 22.

In other embodiments, the VMLOAD/VMSAVE instructions may be defined to load/save the state of two or more control registers that involve serialization in the processor when changed (e.g. paging control registers, mode control registers, etc.). That is, the processor may permit the pipeline to drain of any other instructions, wait for speculative execution of operations to complete, etc. before changing the control registers. While each control register is typically readable/writable using an individual instruction, repeatedly serializing for such individual read/write operations may be slower than having a single instruction that reads/writes multiple control registers. In other embodiments, the VMLOAD/VMSAVE instructions may load/save hidden state and state corresponding to two or more control registers. In still other embodiments, the VMLOAD/VMSAVE instructions may load/save all processor state not loaded/saved by the processor hardware during the switch, or may load/save any subset of the processor state.

As used herein, saving processor state may refer to transferring the processor state from the processor to a storage location (e.g. in memory). The processor state in the processor may not be changed due to the saving. Additionally, restoring processor state may refer to transferring the state from the memory to the processor. The processor state in the memory may not be changed due to the restoring.

For convenience and brevity in the remainder of this description, the portion of the processor state that is saved/loaded during a switch may be referred to as the partial state. The save/load of the partial state may be referred to as a partial state save or load.

Processor Support

Figure 2:
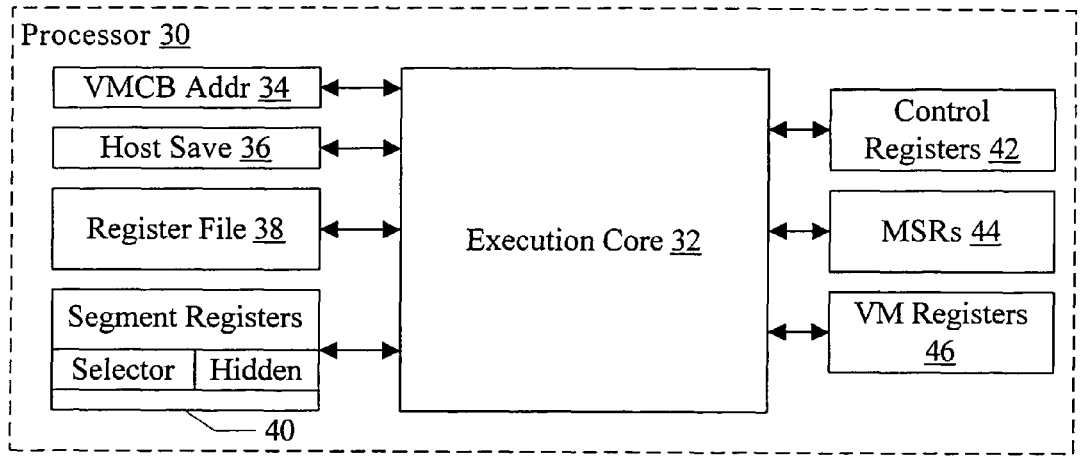
FIG. 2 is a block diagram of a portion of one embodiment of a processor.

FIG. 2 is a block diagram illustrating one embodiment of a processor 30 that may be included in the host hardware 20 and may provide support for world switch with partial state save/load. In the illustrated embodiment, the processor 30 includes an execution core 32, a VMCB address register 34, a host save register 36, a register file 38, a set of segment registers 40, a set of control registers 42, a set of model specific registers (MSRs) 44, and a set of virtual machine (VM) registers 46. The execution core 32 is coupled to each of the registers 34, 36, 38, 40, 42, 44, and 46.

Generally, the execution core 32 is configured to execute the instructions defined in the instruction set architecture implemented by the processor 30 (e.g. the x86 instruction set architecture, including AMD64™ extensions, in some embodiments). The execution core 32 may employ any construction. For example, the execution core 32 may be a superpipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions.

When executing an SVM instruction (described above and in more detail below), the execution core 32 may save the address of the VMCB identified by the SVM instruction (via one or more operands of the SVM instruction) in the VMCB address register 34. Subsequently, during a guest exit, the execution core 32 may save the partial processor state to the VMCB indicated by the VMCB address register 34. The host save register 36 may store an address of a host save area in which host processor state (e.g. corresponding to the VMM 18) may be saved. The execution core 32 may save partial processor state in the host save area during execution of the SVM instruction, and may load partial processor state from the host save area during a guest exit.

The register file 38 may comprise various registers defined for use with the instructions that the execution core 32 is configured to execute. For example, the register file 38 may comprise integer registers, floating point registers, multimedia registers, etc.

The segment registers 40 may be provided in accordance with the x86 instruction set architecture. More particularly, the segment registers 40 may be part of the privilege protection mechanism employed by the processor 30 when the processor is in protected mode. In protected mode, each segment register 40 may be loaned with a segment selector using a segment load instruction. The segment selector identifies a segment descriptor in a segment descriptor table in memory that sets the privilege level for the segment and also includes other protection control bits and other information. When a segment selector is loaded into a segment register 40, the execution core 32 loads the segment descriptor from the segment descriptor table and loads the descriptor information, or information derived from the segment descriptor, into a hidden portion of the segment register. An exemplary segment register is illustrated in the segment registers 40, with a selector field and a hidden field.

The control registers 42 may comprise a variety of control registers that describe the general operating mode of the processor 30. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 42 varies from instruction set architecture to instruction set architecture. In embodiments implementing the x86 instruction set architecture (including AMD64™ extensions, if desired), the control registers 42 may include CR0, CR3, CR4, the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, etc.), etc.

The MSRs 44 may comprise one or more registers that are implementation dependent. That is, the instruction set architecture may permit a given implementation to define any set of MSRs 44 that may be desirable for that implementation.

The VM registers 46 comprise one or more registers that are included in the processor 30 to provide virtual machine support (that is, to support virtualization for the guests 10A-10N). The VMCB address register 34 and the host save register 36 may be considered to be VM registers 46, but have been shown separately in FIG. 2 to illustrate the world switch functionality of the processor 30 (in conjunction with the flowchart discussed below). For example, the VM registers 46 may include registers that may be loaded with virtual interrupt state to permit an interrupt to be injected into a guest. The VM registers 46 may also include an intercepts register or registers. The execution core 32 may be configured to monitor for various intercepts indicated in the intercepts register. The intercepts register may be loaded from the VMCB 22 of a guest 10A-10N when execution of that guest 10A-10N is initiated (e.g. using the SVM instruction described above). If the execution core 32 detects an interceptable event and the intercepts register indicates that the detected event is being intercepted, the execution core 32 may exit the guest being executed and return to the VMM 18. If no intercepts are coded in the intercepts register, then a guest is not in execution. In other embodiments, there may be a "guest mode" bit and all interceptable events may be intercepted. Other VM registers 46 may be included to virtualize various other processor state, system resources, etc. In some embodiments, some or all of the VM registers 46 may be defined as MSRs.

As used herein, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 38 may be implemented in such a fashion, in some embodiments. Any combination of implementations may be used in various embodiments of the processor 30.

The various registers 34, 36, 38, 40, 42, 44, and 46 may comprise processor state in one embodiment. Any other registers may be implemented in other embodiments that may be part of the processor state, as desired.

Figure 3:
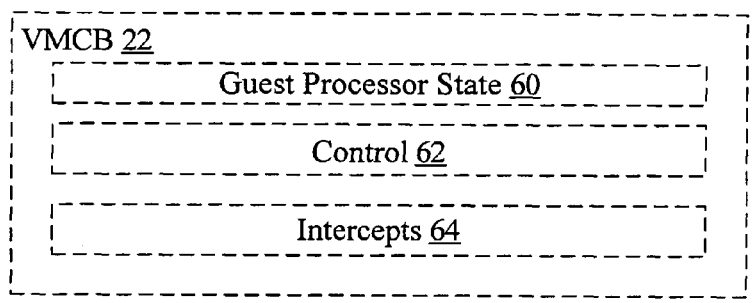
FIG. 3 is a block diagram of one embodiment of a virtual machine control block.

FIG. 3 is a block diagram of one embodiment of a VMCB 22. In the embodiment of FIG. 3, the VMCB 22 may include a guest processor state 60, control data 62, and intercepts 64. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state and/or architected state that is considered part of the processor's context. The guest processor state 60 may correspond to an initial state of the processor if the guest has not yet executed. The processor 30 may load processor state of the processor 30 from the guest processor state 60 during execution of the SVM instruction (a switch from the VMM 18 to the guest 10A-10N that corresponds to the VMCB 22). The processor 30 may save processor state from the processor 30 to the guest processor state 60 during the guest exit (a switch from the guest 10A-10N that corresponds to the VMCB 22 to the VMM 18). The guest processor state 60 may be defined to store all the processor state, even though the processor 30 only saves/loads the partial state described above. Other state may be saved/loaded by the VMM 18 as needed. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60.

The control data 62 may include any desired control information to be used when execution of the corresponding guest is initiated or exited. As mentioned previously, the control data 62 may include a guest exit code written by the processor 30 upon guest exit to indicate the reason for guest exit. The intercepts 64 may specify which events are to be intercepted (causing an exit from the guest). Various intercepts may be defined in various embodiments. In one embodiment, at least some of the intercepts are defined as intercept indications in the intercepts 64. Each intercept indication may, e.g., be a bit which may enable the intercept when set or disable the intercept when clear. Other embodiments may assign the opposite meanings to the states of the bit or may use other indications.

Figure 4:
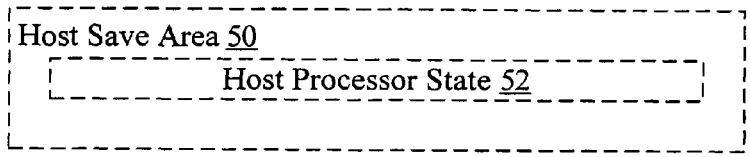
FIG. 4 is a block diagram of one embodiment of a host save area.

FIG. 4 is a block diagram of one embodiment of a host save area 50 that may be used to store host processor state 52. The host processor state 52, similar to the guest processor state 60, may be defined to store all the processor state that is considered part of the context. However, the host processor state 52 may correspond to the VMM 18 (and other host code, such as a host O/S, in some embodiments). In other embodiments, the host processor state 52 may not be defined to store all the processor state. The host processor state 52 may defined the same as the guest processor state 60 in some embodiments. The processor 30 may save processor state from the processor 30 to the host processor state 52 during execution of the SVM instruction, and may load processor state to the processor 30 from the host processor state 52 during a guest exit. The host save register 36 may store an address that locates the host save area 50.

Figure 5:
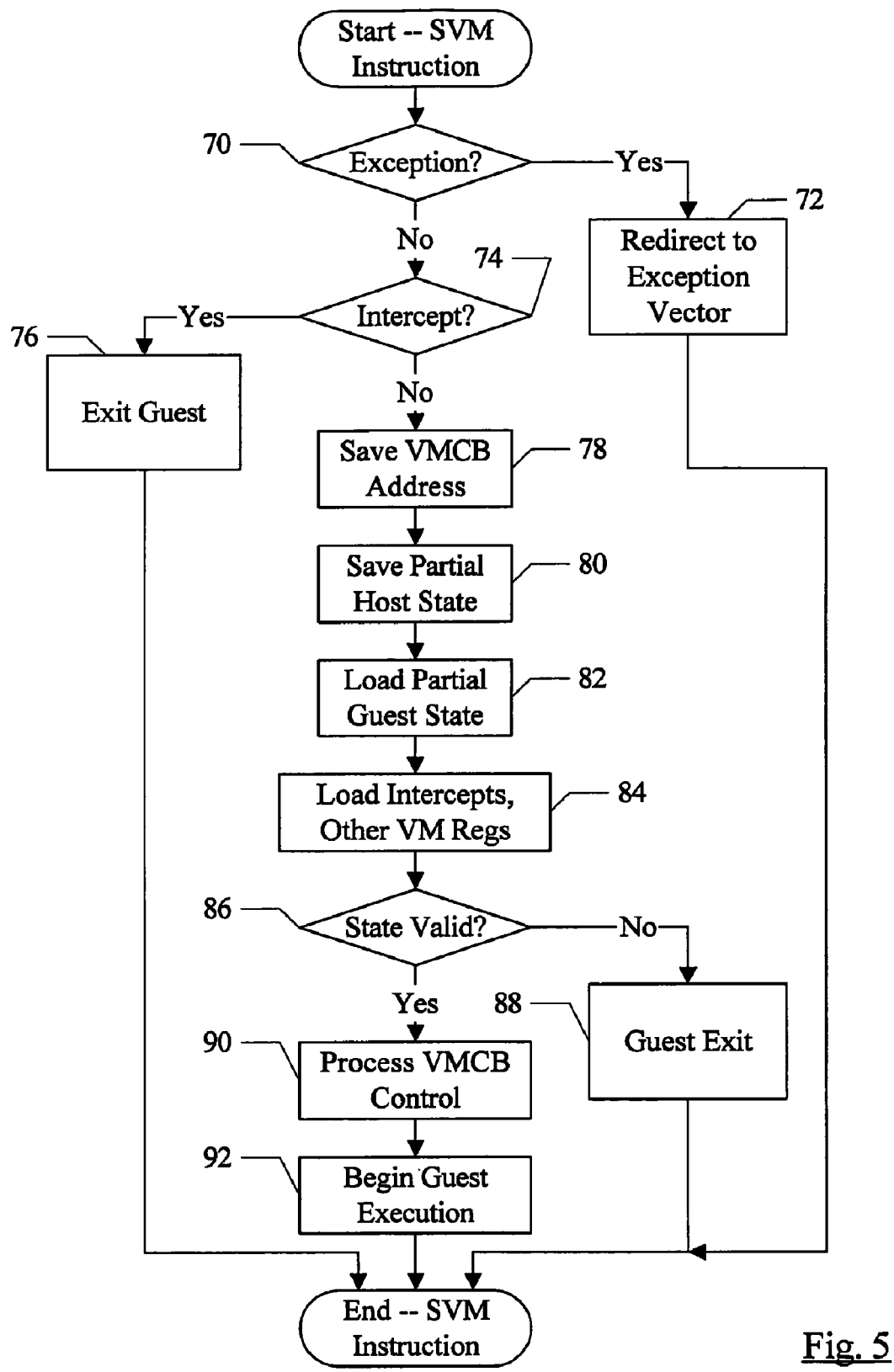
FIG. 5 is a flowchart illustrating operation of one embodiment of a processor in response to a start virtual machine (SVM) instruction.

Turning next to FIG. 5, a flowchart is shown illustrating operation of one embodiment of the processor 30 (and more particularly the execution core 32, in the embodiment of FIG. 2) to execute an SVM instruction. The processor 30/execution core 32 may comprise circuitry, microcode, or any combination thereof that implements the operation shown in FIG. 5. The execution may be pipelined over multiple clock cycles, if desired.

The execution core 32 may determine if the SVM instruction causes an exception (decision block 70). If the SVM instruction causes an exception (decision block 70, "yes" leg), the execution core 32 may redirect execution to the exception vector that corresponds to the exception, as defined in the instruction set architecture implemented by the processor 30 (block 72). Various exception conditions may be checked for in various embodiments. For example, in one embodiment, the SVM instruction may be enabled via a bit in one of the VM registers 46. If the SVM instruction is not enabled, an exception may be signalled. Also, the SVM instruction may be a privileged instruction in one embodiment, and thus if the processor 30 is not in a privileged mode (e.g. the privileged mode is a current privilege level of zero in the x86 instruction set architecture), an exception may be signalled. In one embodiment, the SVM instruction may only be executed if paging is enabled and in protected mode and thus an exception may be signalled if the proper mode is not set in the control registers 42. In one embodiment, the VMCB 22 may be required to be aligned to a page boundary and the SVM instruction may cause an exception if the VMCB 22 is not so aligned. In one embodiment, the SVM instruction may not be executed in virtual 8086 mode, and an exception may be signalled if the processor 30 is in virtual 8086 mode.

In one embodiment, execution of the SVM instruction is one of the events that may be intercepted. If the execution is intercepted (decision block 74, "yes" leg), the execution core 32 may exit the guest instead of executing the SVM instruction (block 76).

If there is no exception or intercept (decision block 70, "no" leg and decision block 74, "no" leg), the execution core 32 may save the VMCB address in the VMCB address register 34 (block 78). The VMCB address may be specified by one or more operands of the SVM instruction. For example, in one embodiment, the VMCB address may be specified in the RAX register (the 64 bit version of the EAX register defined in the AMD64™ extension to the x86 instruction set architecture). Additionally, execution core 32 may save the partial host state to the host save area 50 indicated by the host save register 36 (block 80). The execution core 32 may load the partial guest state from the guest processor state 60 of the VMCB 22 (block 82). Additionally, the execution core 32 may load the intercepts from the intercepts 64 of the VMCB 22 and any other VM registers 46 as specified in the VMCB 22 (block 84).

The execution core 32 may check the processor state as loaded from the VMCB 22 to ensure that a valid state has been loaded (decision block 86). If an invalid state has been loaded (decision block 86, "no" leg), the execution core 32 may exit the guest (block 88). In other embodiments, the execution core 32 may cause an exception, if the processor 30 may function in the invalid state, or a processor shutdown (e.g. similar to entering a low power state). In still other embodiments, the execution core 32 may check the state in the VMCB 22 and the processor 30 (for state not loaded during execution of the SVM instruction) prior to loading the state to ensure that the state is valid (e.g. as part of determining whether or not to cause an exception, illustrated at decision block 70).

If the processor state is valid (decision block 86, "yes" leg), the execution core 32 may process any operations specified in the VMCB control 62 (block 90). The execution core 32 may then begin guest execution (block 92).

FIG. 6 is a pair of tables 100 and 102 illustrating the partial processor state saved and loaded according to one embodiment of the processor 30 that implements the x86 instruction set architecture (including the AMD64™ extensions). The register names used in the tables 100 and 102 correspond to the names used in the x86 instruction set architecture with AMD64™ extensions. Other embodiments may save/load any partial processor state, including any subset or superset of the state shown.

Table 100 shows the partial host state that is saved during execution of the SVM instruction and loaded during guest exit for the present embodiment. In the illustrated embodiment, the partial host state includes: the CS segment selector and the instruction pointer of the next instruction in the host after the SVM instruction (next_RIP); the flags (RFLAGS); the RAX register; the SS segment selector; the current stack pointer (RSP); the control registers CR0, CR3, CR4, and EFER; the interrupt descriptor table register (IDTR); the global descriptor table register (GDTR); the ES segment selector; and the DS segment selector.

Table 102 shows the partial guest state that is loaded during execution of the SVM instruction and saved during guest exit for the present embodiment. In the illustrated embodiment, the same processor state shown in table 100 is saved/loaded. Additionally, the hidden portion of the CS, DS, ES, and SS segment registers is saved/loaded as well as the debug registers DR6 and DR7 and the VM registers 46. Thus, in this embodiment, the partial state saved/loaded for a host and the partial state saved/loaded for a guest during a switch overlap but are not identical. In other embodiments, the same partial state may be saved/loaded for host and guest, or other overlapping subsets of processor state may be saved/loaded.

Figure 7:
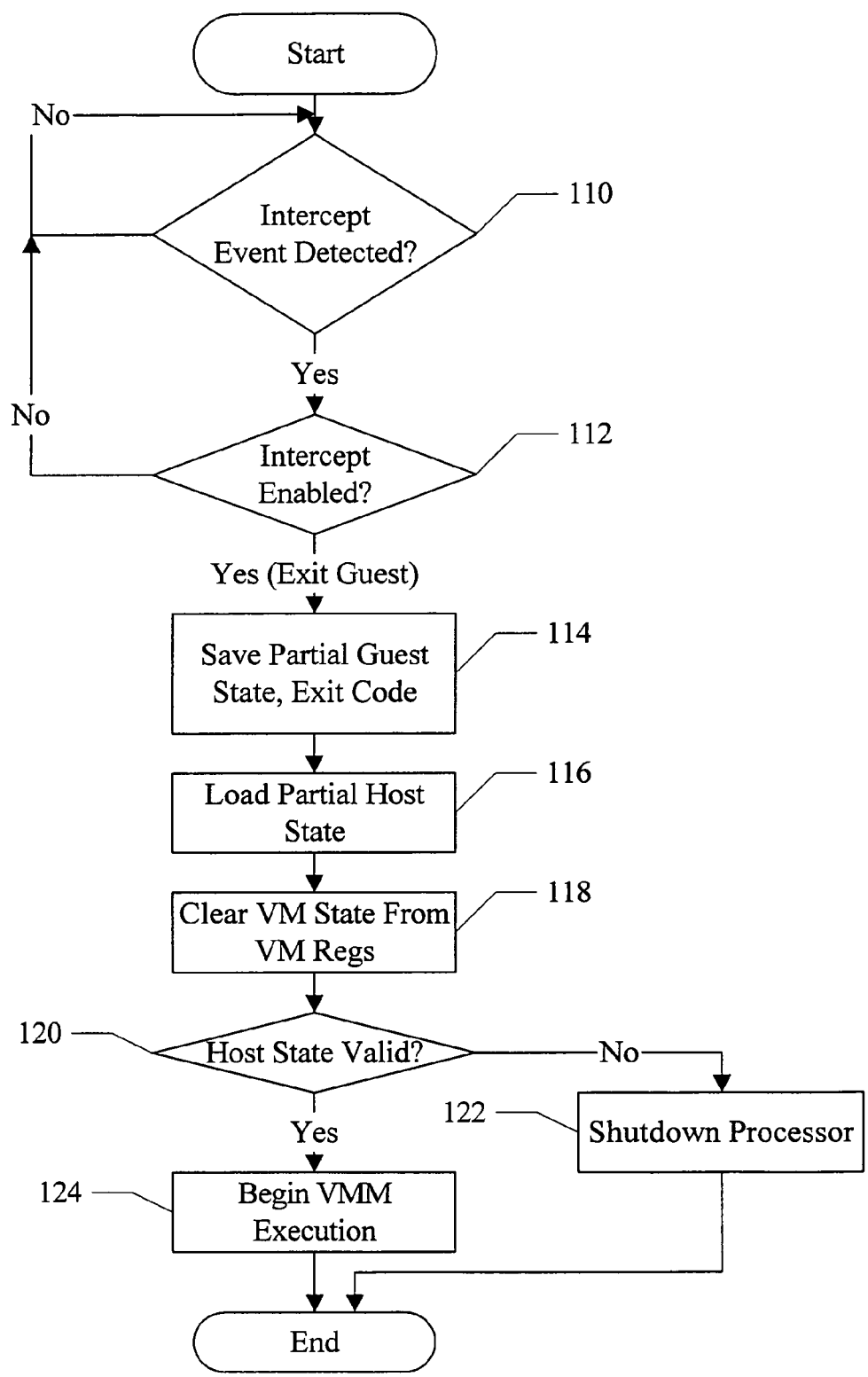
FIG. 7 is a flowchart illustrating one embodiment of intercepting an event in the guest.

Turning next to FIG. 7, a flowchart is shown illustrating operation of one embodiment of the processor 30 (and more particularly the execution core 32) for detecting a guest exit and performing the guest exit. The processor 30/execution core 32 may comprise circuitry, microcode, or any combination thereof that implements the operation shown in FIG. 7. The execution may be pipelined over multiple clock cycles, if desired.

If the execution core 32 detects an intercept event (decision block 110, "yes" leg) and the corresponding intercept is enabled (in the VMCB 22, and loaded into the processor 30 when execution of the guest is started—decision block 112, "yes" leg) the execution core 32 exits the guest. If no intercept event is detected (decision block 110, "no" leg) or the intercept is not enabled (decision block 112, "no" leg), execution continues.

If the guest is being exited, the execution core 32 may save the partial processor state into the guest's VMCB 22 and the exit code indicating the reason for exit (e.g. identifying the intercept event that was detected). As mentioned previously, the guest's VMCB 22 may be located by the address in the VMCB address register 34 (block 114). The execution core 32 may load the partial host state from the host save area 50, as located by the host save register 36 (block 116). Additionally, the execution core 32 may clear the VM state from the VM registers 46 (block 118). For example, the virtual interrupt request used to inject a virtual interrupt into a guest may be cleared to prevent the virtual interrupt from being taken in the VMM 18.

The execution core 32 may check the processor state as loaded from the host save area 50 to ensure that a valid state has been loaded (decision block 120). If an invalid state has been loaded (decision block 120, "no" leg), the execution core 32 may shutdown the processor 30 (block 122). In other embodiments, the execution core 32 may cause an exception or a guest exit, or may check the state in the host save area 50 and the processor 30 (for state not loaded during the guest exit) prior to loading the state to ensure that the state is valid. If the processor state is valid (decision block 120, "yes" leg), the execution core 32 may begin VMM execution (block 124).

Figures 8, 9:
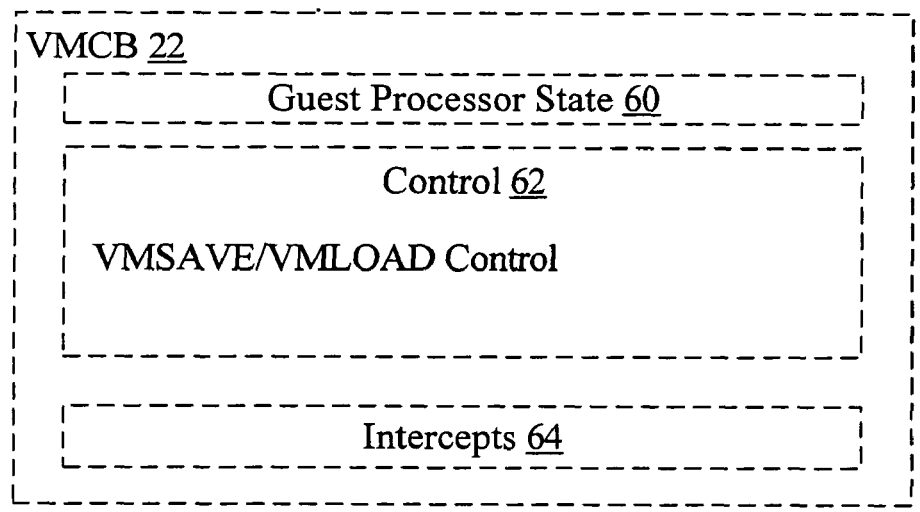
FIG. 8 is a table illustrating one embodiment of processor state saved and loaded in response to VMSAVE and VMLOAD instructions.
FIG. 9 is a block diagram of a second embodiment of a virtual machine control block.

FIG. 8 is a table 130 illustrating additional processor state saved via execution of the VMSAVE instruction and loaded via execution of the VMLOAD instruction for one embodiment. Other embodiments may save/load any state, including any subset or superset of the state shown. In the illustrated embodiment, state saved/loaded includes the selector and hidden portions of the FS and GS segment registers; the local descriptor table register (LDTR) including hidden portion that stores the descriptor for the local descriptor table from the global descriptor table; the task register (TR) including hidden state; the KernelGSBase register defined in the AMD64™ extension; the STAR, LSTAR, CSTAR, and SFMASK registers used with the SYSCALL and SYSRET instructions; and the CS, ESP, and EIP values used with the SYSENTER instruction.

In the embodiment illustrated via FIG. 8, the additional processor state saved and loaded via the VMSAVE and VMLOAD instructions is fixed (e.g. predetermined as part of the instruction definition). In other embodiments, the additional processor state may be programmable. For example, FIG. 9 is a block diagram of another embodiment of the VMCB 22 in which the additional processor state saved/loaded is controlled by a VMSAVE/VMLOAD control field included in the control 62. The VMSAVE/VMLOAD control field may be programmed to control the additional processor state that is saved/loaded. For example, the control field may include a bit for each register that may be saved/loaded via the VMSAVE/VMLOAD instructions. If the bit is set, that state is saved/loaded and if the bit is clear the state is not saved/loaded. Other embodiments may use the opposite definition of the bits or use other indications. A single control field may be used to control both instructions, or separate control fields may be used for each instruction. In other embodiments, an operand of the VMSAVE/VMLOAD instructions may control the additional processor state that is saved/loaded, or a control register or other register (e.g. one of the VM registers 46) may be programmed to identify the additional processor state that is saved/loaded. In some embodiments, the partial state saved and loaded during the switch may similarly be programmable.

In still other embodiments, the processor state saved/loaded via the VMSAVE/VMLOAD instructions may be dependent on the processor mode. For example, in some processor modes (e.g. the "long modes" defined in the AMD64™ extension), the segment registers are not used. Thus, the hidden part of the segment registers need not be saved/loaded in such modes.

Figures 10, 11:
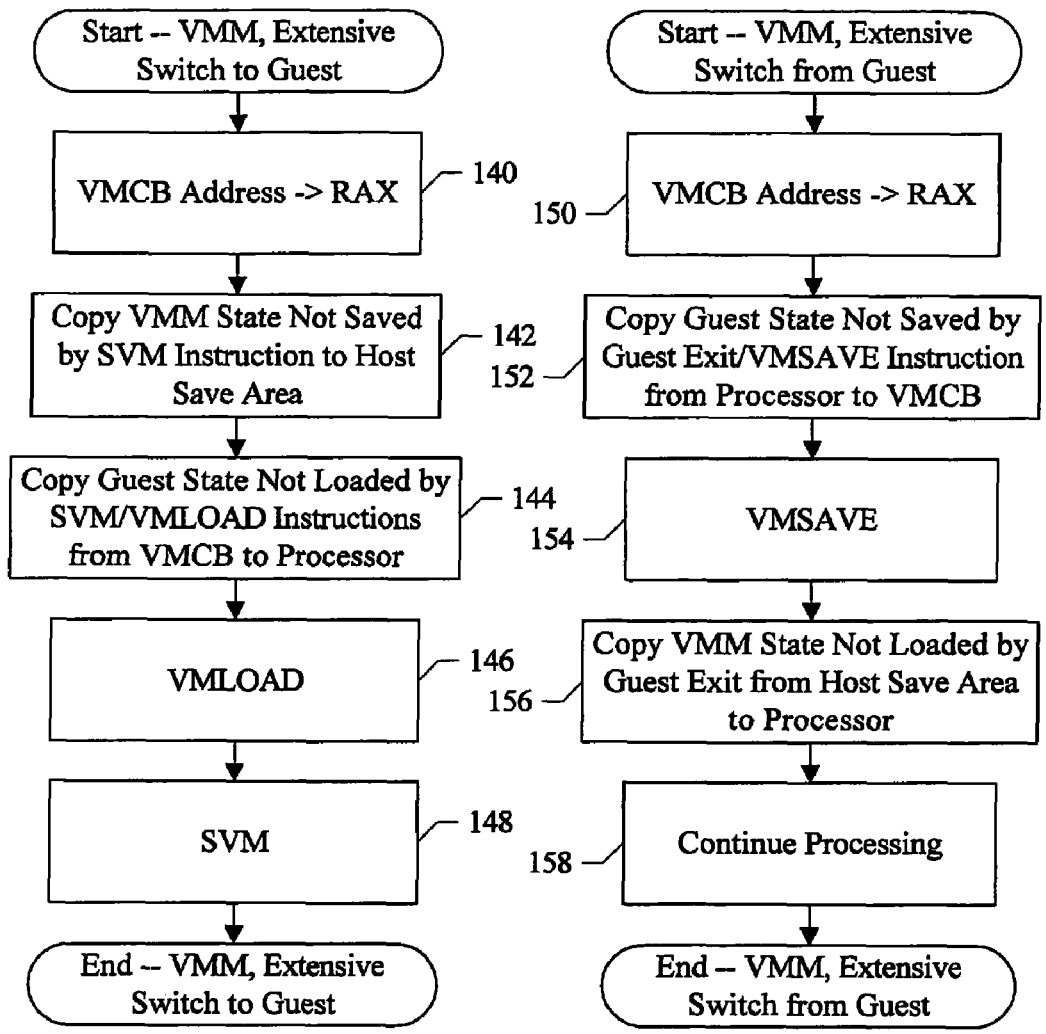
FIG. 10 is a flowchart illustrating one embodiment of a virtual machine manager (VMM) for extensive state movement when switching to a guest.
FIG. 11 is a flowchart illustrating one embodiment of a VMM for extensive state movement when switching from a guest.

Turning now to FIG. 10, a flowchart is shown illustrating one embodiment of the VMM 18 for extensive processor state movement for a switch to a guest. That is, the state movement may include more processor state than the partial state saved and loaded by the processor hardware during the switch. The VMM 18 may comprise instructions which, when executed, implement the operation shown in FIG. 10. That is, the instructions may be executed before the switch to the guest.

The VMM 18 may load the address of the VMCB 22 of the guest 10A-10N that is to be executed into the RAX register (block 140). The VMM 18 may copy the processor state corresponding to the VMM that is not saved via execution of the SVM instruction from the processor 30 to the host save area 50 (block 142). Alternatively, in embodiments in which the host save area 50 does not store all the processor state, the VMM 18 may copy state to another memory area allocated by the VMM 18 for such state. The VMM 18 may copy the processor state not loaded via execution of the SVM/VMLOAD instructions from the VMCB 22 (and/or other memory, in various embodiments) to the processor 30 (block 144). Blocks 142 and 144 may comprise move instructions or specially defined instructions that are used to read/write a particular register. The VMM 18 may include the VMLOAD instruction (block 146) and then the SVM instruction (block 148) to start the guest 10A-10N.

On the other hand, for a non-extensive case (e.g. a case in which the partial state that is saved and loaded during the switch is sufficient), blocks 142, 144, and 146 may be eliminated. In still other embodiments, executing only the VMLOAD instruction in addition to the SVM instruction may be sufficient, or executing instructions to move state not handled by the SVM instruction or the VMLOAD instruction may be sufficient.

Turning now to FIG. 11, a flowchart is shown illustrating one embodiment of the VMM 18 for extensive processor state movement for a switch from a guest (to the VMM). That is, the state movement may include more processor state than the partial state saved and loaded during the switch. The VMM 18 may comprise instructions which, when executed, implement the operation shown in FIG. 11. The instructions may be executed after the switch from the guest to the VMM 18 (e.g. after a guest exit).

The VMM 18 may load the address of the VMCB 22 of the guest 10A-10N that is has been switched from into the RAX register (block 150). The address may be used by the VMSAVE instruction. The VMM 18 may copy the processor state corresponding to the guest that is not saved via guest exit and execution of the VMSAVE instruction from the processor 30 to the VMCB 22 and/or another memory area (block 152). The VMM 18 may include the VMSAVE instruction to save the additional state to the VMCB 22 (block 154). The VMM 18 may copy the processor state not loaded via the guest exit from the host save area 50 and/or another memory area to the processor 30 (block 156). Blocks 152 and 154 may comprise move instructions or specially defined instructions that are used to read/write a particular register. The VMM 18 may continue processing the event that caused the guest exit (block 158)

On the other hand, for a non-extensive case (e.g. a case in which the partial state that is saved and loaded during the switch is sufficient), blocks 150, 152, 154, and 156 may be eliminated. In still other embodiments, executing only the VMSAVE instruction in addition to the guest exit may be sufficient, or executing instructions to move state not handled by the guest exit or the VMSAVE instruction may be sufficient.

Figure 12:
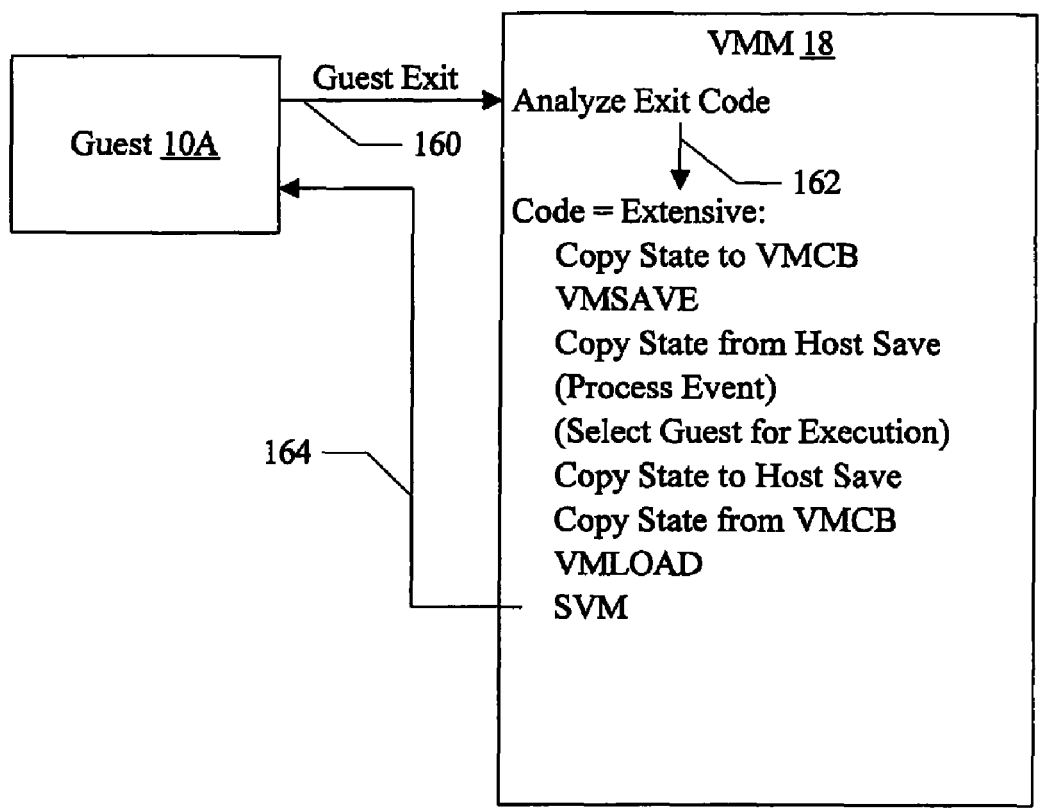
FIG. 12 is an example of processing an event from a guest using extensive state movement.
Figure 13:
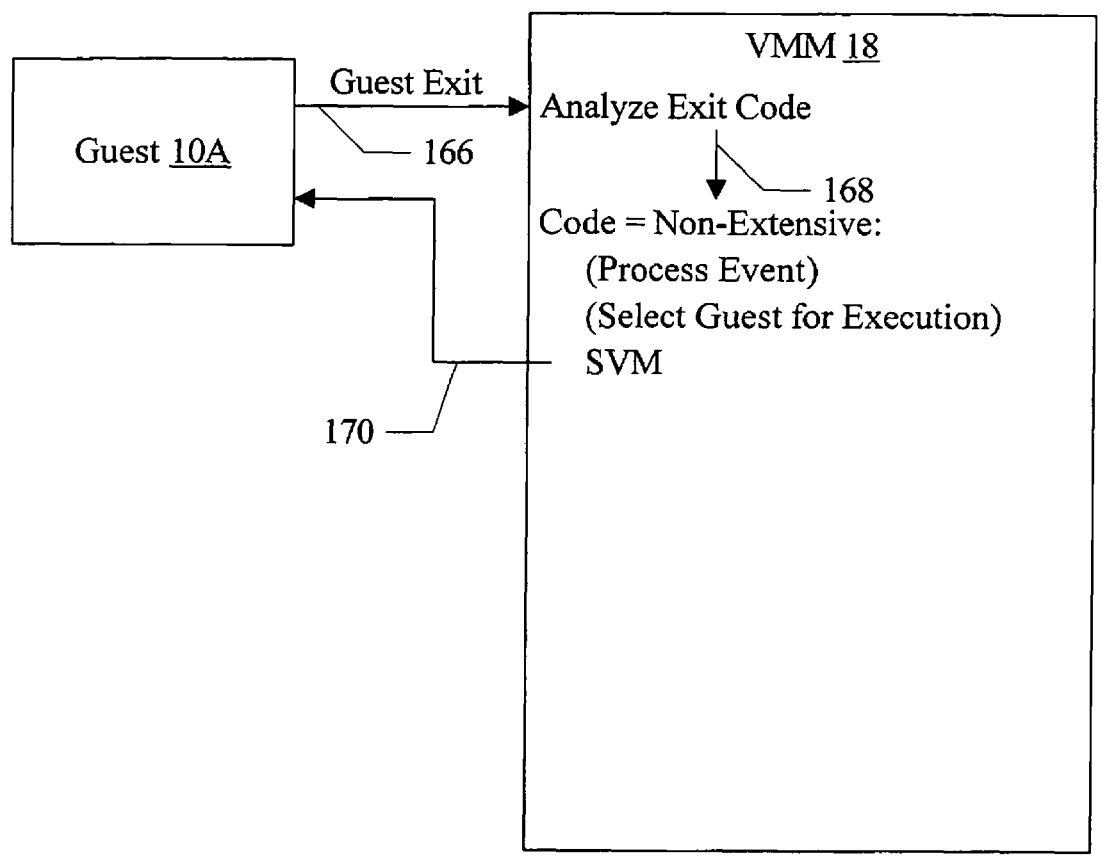
FIG. 13 is an example of processing an event from a guest using non-extensive state movement.

FIGS. 10 and 11 illustrate the VMM 18 for extensive state movement cases for switching to a guest and switching back from a guest. FIGS. 12 and 13 are examples that give a slightly different view, in which a guest exit is detected, the event processed, and the guest restarted. The guest 10A is used in the example, although any guest 10A-10N may be used.

FIG. 12 illustrates a case in which the processing of the event involves extensive state movement. The guest 10A is executing, and a guest exit is detected (arrow 160). During the guest exit, the partial state defined to be saved and loaded in the guest exit is saved to the VMCB 22 and loaded from the host save area 50. The VMM 18 is started, and analyzes the exit code in the VMCB 22. The VMM 18 determines that the detected event is one which requires extensive state movement to provide enough host state to process the event (arrow 162). The VMM 18 thus copies additional state to the VMCB 22 (and/or another memory area), executes the VMSAVE instruction, and copies additional state from the host save area 50 (and/or another memory area). The VMM 18 processes the event (illustrated in FIG. 12 as "(Process Event)") and selects the guest 10A for execution (illustrated in FIG. 12 as "(Select Guest for Execution)"). Since extensive state movement was performed prior to processing the event, extensive state movement may again be performed to start the guest 10A again. The VMM 18 thus copies processor state to the host save area 50 (and/or another memory area), copies processor state from the VMCB 22 (and/or another memory area) to the processor, and executes the VMLOAD and SVM instructions. Responsive to the SVM instruction, the guest 10A is started (and the partial state save and load defined for the SVM instruction is performed) (arrow 164).

FIG. 13 illustrates a case in which the processing of the event does not involve extensive state movement. The guest 10A is executing, and a guest exit is detected (arrow 166). During the guest exit, the partial state defined to be saved and loaded in the guest exit is saved to the VMCB 22 and loaded from the host save area 50. The VMM 18 is started, and analyzes the exit code in the VMCB 22. The VMM 18 determines that the detected event is one which does not require extensive state movement to provide enough host state to process the event (arrow 168). Thus, the VMM 18 processes the event (illustrated in FIG. 13 as "(Process Event)") and selects the guest 10A for execution (illustrated in FIG. 13 as "(Select Guest for Execution)") without any additional instructions to move state. Since extensive state movement was not performed prior to processing the event, the processor state in the processor 30, except for the state changed during the switch is still the guest state. The VMM 18 executes the SVM instruction. Responsive to the SVM instruction, the guest 10A is started (and the partial state save and load defined for the SVM instruction is performed) (arrow 170). While both FIGS. 12 and 13 illustrate the VMM 18 selecting the guest 10A for execution again after processing the event, in other cases the VMM 18 may select a different guest for execution.

Figure 14:
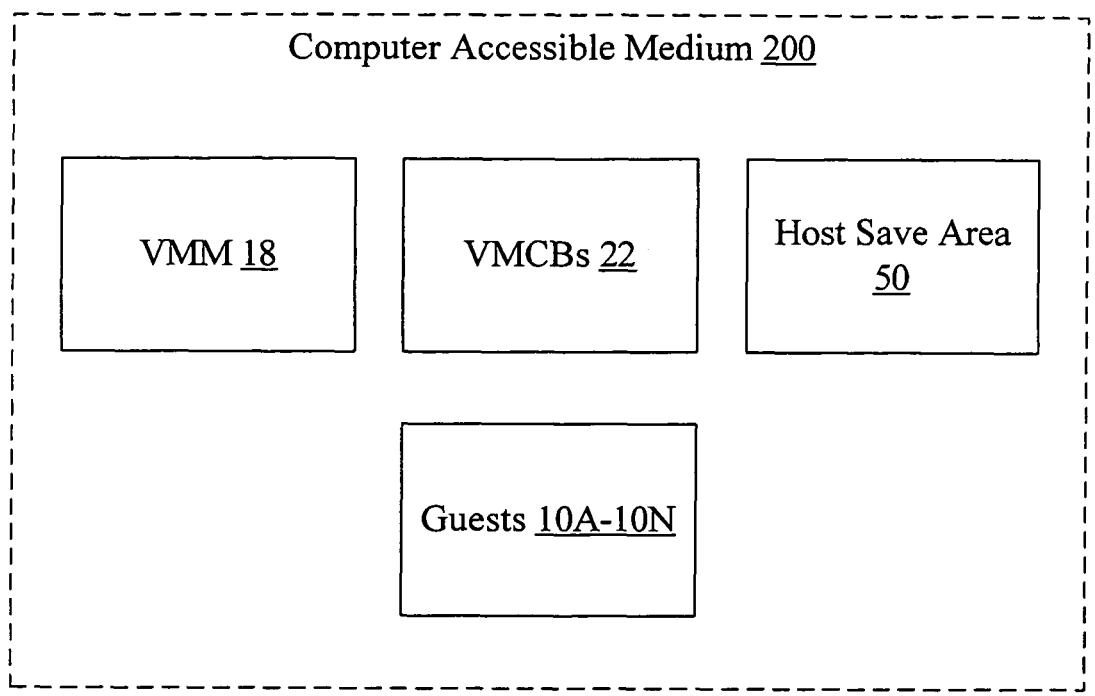
FIG. 14 is a block diagram of one embodiment of a computer accessible medium.

Turning now to FIG. 14, a block diagram of a computer accessible medium 200 is shown. Generally speaking, a computer accessible medium may include any media accessible by a computer during use to provide instructions and/or data to the computer.

For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 14 may store one or more of the VMM 18, one or more VMCBs 22, the host save area 50, and/or guests 10A-10N. The VMM 18 may comprise instructions which implement the operations described for the VMM 18 herein. Generally, the computer accessible medium 200 may store any set of instructions which, when executed, implement a portion or all of the operations shown in one or more of FIGS. 10-13. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A processor comprising:
a plurality of registers configured to store processor state; and
an execution core coupled to the plurality of registers, wherein the execution core is configured to execute instructions defined in an instruction set architecture implemented by the processor, and wherein the execution core is configured, during a switch from processor execution of a guest to processor execution of a virtual machine manager (VMM) that controls the guest, to automatically save a portion of the processor state to a memory, the portion of the processor state corresponding to the guest, wherein the execution core is configured to initiate the switch in response to detecting an intercept event programmed for the guest, and wherein the execution core is configured to execute instructions in the guest during processor execution of the guest, and wherein the execution core is configured to execute instructions forming the VMM during processor execution of the VMM, and wherein the execution core is configured to automatically save the portion of the processor state prior to executing an initial instruction of the VMM in response to the switch, and wherein the execution core is configured to save an additional portion of the processor state subsequent to the switch in response to executing one or more additional instructions after the switch.

2. The processor as recited in claim 1 wherein the processor state is saved to a storage area of the memory that is allocated to the guest.

3. The processor as recited in claim 2 wherein the one or more additional instructions comprise a first instruction defined to save the additional portion of the processor state, the first instruction useable after the switch to save the additional portion of the processor state to the storage area.

4. The processor as recited in claim 3 wherein the additional portion comprises hidden state in the plurality of registers.

5. The processor as recited in claim 3 wherein the storage area further comprises a control portion that is programmable to control which processor state is included in the additional portion saved in response to the first instruction.

6. The processor as recited in claim 3 wherein which processor state is included in the additional portion is fixed.

7. The processor as recited in claim 1 wherein the execution core is further configured, during the switch, to automatically load a portion of a second processor state from the memory to the plurality of registers, and wherein the second processor state corresponds to the VMM.

8. The processor as recited in claim 7 wherein the portion of the second processor state comprises a same portion of the processor state as the portion saved during the switch.

9. The processor as recited in claim 8 wherein the portion of the second processor state comprises additional state in addition to the same portion.

10. The processor as recited in claim 7 wherein the execution core is further configured, during the switch, to load the portion of the second processor state from a second storage area of the memory, the second storage area allocated to the VMM.

11. The processor as recited in claim 10 wherein the execution core is configured to execute a first instruction defined to initiate execution of the guest, wherein the first instruction causes a second switch from processor execution of the VMM to processor execution of the guest, wherein the execution core is configured to load only a portion of the processor state corresponding to the guest in response to the first instruction, and wherein the execution core is configured to execute a second instruction defined to load an additional portion of the second processor state, the instruction useable before the second switch to load the additional portion of the processor state from the storage area.

12. The processor as recited in claim 11 wherein the additional portion comprises hidden state in the plurality of registers.

13. A computer system comprising:
host hardware comprising a processor comprising a plurality of registers configured to store processor state and an execution core coupled to the plurality of registers, wherein the execution core is configured to execute instructions defined in an instruction set architecture implemented by the processor, and wherein the host hardware further comprises a memory;
a virtual machine manager (VMM); and
at least one guest;
wherein the execution core is configured, during a switch from processor execution of the guest to processor execution of the VMM that controls the guest, to automatically save a portion of the processor state to the memory, the processor state corresponding to the guest, wherein the execution core is configured to initiate the switch in response to detecting an intercept event programmed for the guest, and wherein the execution core is configured to execute instructions in the guest during processor execution of the guest, and wherein the execution core is configured to execute instructions forming the VMM during processor execution of the VMM, and wherein the execution core is configured to automatically save the portion of the processor state prior to executing an initial instruction of the VMM in response to the switch, and wherein the execution core is configured to save an additional portion of the processor state subsequent to the switch in response to executing one or more additional instructions after the switch.

14. The computer system as recited in claim 13 wherein the processor state is saved to a storage area of the memory that is allocated to the guest.

15. The computer system as recited in claim 14 wherein the VMM includes a first instruction defined to save the additional portion of the processor state.

16. The computer system as recited in claim 15 wherein the additional portion comprises hidden state in the plurality of registers.

17. The computer system as recited in claim 13 wherein the processor is further configured, during the switch, to automatically load a portion of a second processor state from the memory to the plurality of registers, and wherein the second processor state corresponds to the VMM.

18. The computer system as recited in claim 17 wherein the processor is further configured, during the switch, to load the portion of the second processor state from a second storage area of the memory, the second storage area allocated to the VMM.

19. The computer system as recited in claim 18 wherein the VMM includes a first instruction defined to initiate execution of the guest, wherein the first instruction causes a second switch from processor execution of the VMM to processor execution of the guest, wherein the processor is configured to load only a portion of the processor state corresponding to the guest in response to the first instruction, and wherein the VMM includes a second instruction defined to load an additional portion of the processor state corresponding to the guest, the second instruction included in the VMM before the first instruction to load the additional portion of the processor state from the storage area.

20. The computer system as recited in claim 19 wherein the additional portion comprises hidden state in the plurality of registers.

21. A method comprising:
switching, by an execution core in a processor, from processor execution of a guest to processor execution of a virtual machine manager (VMM) that controls execution of the guest, wherein the switching is in response detecting an intercept event programmed for the guest, and wherein processor execution of the guest comprises the execution core executing instructions in the guest, and wherein processor execution of the VMM comprises the execution core executing instructions in the VMM;
during the switching and prior to executing an initial instruction of the VMM in response to the switching, the execution core automatically saving a portion of a processor state to memory, the processor state corresponding to the guest, wherein the execution core is configured to execute instructions defined in an instruction set architecture implemented by the processor; and
subsequent to the switching, saving an additional portion of the processor state in response to executing one or more additional instructions.

22. The method as recited in claim 21 wherein the processor state is saved to a storage area of the memory that is allocated to the guest.

23. The method as recited in claim 22 wherein the VMM includes a first instruction defined to save the additional portion of the processor state.

24. The method as recited in claim 23 wherein the additional portion comprises hidden state in a plurality of registers of the processor.

25. The method as recited in claim 21 further comprising, during the switching, loading a portion of a second processor state from the memory to the processor, and wherein the portion of the second processor state corresponds to the VMM.

26. The method as recited in claim 25 wherein the loading of the portion of the second processor state is from a second storage area of the memory, the second storage area allocated to the VMM.

27. The method as recited in claim 26 further comprising:
executing a first instruction in the VMM, wherein the first instruction is defined to initiate execution of the guest, wherein the first instruction causes a second switch from processor execution of the VMM to processor execution of the guest, and wherein executing the first instruction includes loading only a portion of the processor state corresponding to the guest; and
executing a second instruction in the VMM prior to executing the first instruction, the second instruction defined to load an additional portion of the processor state from the storage area.

28. The method as recited in claim 27 wherein the additional portion comprises hidden state in a plurality of registers of the processor.

* * * * *